May 18, 1943     F. E. CARLSON     2,319,489
OPTICAL SYSTEM
Filed Nov. 2, 1940
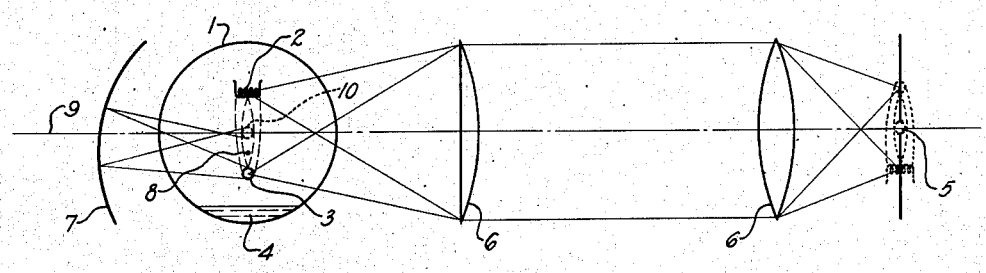
Inventor:
Frank E. Carlson,
by John H. Anderson
His Attorney.

Patented May 18, 1943

2,319,489

UNITED STATES PATENT OFFICE 2,319,489

OPTICAL SYSTEM

Frank E. Carlson, East Cleveland, Ohio, assignor to General Electric Company, a corporation of New York Application November 2, 1940, Serial No. 364,088

6 Claims. (Cl. 88—24)

My invention relates to an optical system which may be used in recording systems of the type wherein sound wave patterns are recorded upon photographic films by means of ultra-violet radiation. More particularly, in a specific application, it relates to improved monitoring means for such systems when using as the source of ultra-violet radiation a mercury vapor discharge lamp of the type shown in the co-pending application Serial No. 364,019, of even date, filed by Alton G. Foote and assigned to the same assignee as the present invention.

In sound recording systems employing ultra-violet radiation, it is generally necessary to also employ a certain amount of visible light for monitoring purposes, i. e., for affording to the operator a visual indication of the performance of the system. The mercury lamps used in such systems have the disadvantage that the radiation from the arc itself includes little or no visible light for this purpose. While one or more of the electrodes may be hot enough to furnish the required visible light, these are generally obscured from the vew of the optical system by apertures designed to select only a small area of the arc surface as the source of ultra-violet radiation. I have found that this defect can be remedied by employing a spherical mirror to reflect an image of such an incandescent electrode into the center of the arc at which point it will be within the field of the optical system.

Accordingly, it is an object of my invention to devise means whereby a mercury vapor lamp may be made to furnish visible light for monitoring purposes in an ultra-violet sound recording system.

Further objects and advantages of my invention will become apparent from the following detailed description and accompanying drawing which shows diagrammatically a system incorporating my invention.

Referring to the figure, the lamp 1 is of the type described in the above-mentioned application and comprises a thermionic activated cathode 2, an anode 3 and a mercury pool 4. Ultra-violet radiation produced by the discharge passes through a lens system represented by lenses 6 and through aperture 5 to subsequent recording and monitoring means (not shown). The aperture 5 may be replaced by a small mirror of the same area. In the claims, I employ the term target as a generic expression to include such a mirror as well as the aperture 5. For a more complete description of a recording and monitoring system of the type here involved, reference may be had to an article by G. L. Dimmick at page 258, of vol. XXIX (Sept. 1937) of the Journal of the Society of Motion Picture Engineers. For the purposes of this disclosure, it is sufficient to observe that the beam of radiant energy passing through aperture 5 must contain, in addition to the ultra-violet for recording, a substantial amount of visible radiation for monitoring. Unfortunately the mercury arc contains in itself insufficient visible radiation for this purpose. Generally, anode 3 will run at a high enough temperature to emit some visible light but this is excluded from the system by the small size of aperture 5.

In order to remedy the foregoing situation, I have provided the spherical mirror 7 which is arranged to form an image of the incandescent anode 3 in the arc. As is well known, if an object be placed at a point a short distance from the center of curvature of a spherical mirror, an image thereof will be formed at a symmetrically disposed point on the opposite side of the center of curvature. Thus if the mirror 7 be so disposed that its center of curvature 8 is midway between the center of anode 3 and the axis 9 of the optical system, an image 10 of the anode will be formed on the axis 9 of the optical system. This image will then supply the needed visible light. I have found that this arrangement gives a very satisfactory monitoring signal and completely overcomes the deficiency of the mercury arc in visible light.

It will be understood that many modifications within the scope of the appended claims may occur to those skilled in the art to which my invention appertains. For example, other optical systems which will produce an image of anode 3 at the desired point may be used. All such modifications I aim to include within the scope of the appended claims.

What I claim as new and desire to secure by Letters Patent of the United States is:

1. In a light projection system, an electric discharge lamp comprising an envelope containing a pair of spaced electrodes, at least one of which is incandescent during operation of the lamp, a target, an optical system constructed and arranged to focus upon said target an image of the arc stream, said target being of smaller dimensions than said arc stream image so that it receives only a portion of the arc stream image to the exclusion of an image of said incandescent electrode, and means for creating an additional image of said incandescent electrode on said target and for causing the rays which form said image to follow substantially the same optical path as the rays which form the arc stream image whereby radiation from said incandescent electrode supplements the radiation from said arc stream falling on said target.

2. In a light projection system, an electric discharge lamp comprising an envelope containing a pair of spaced electrodes, at least one of which is incandescent during operation of the lamp, a target, an optical system between said lamp and target having its axis normal to the line joining said electrodes and passing through said target, said optical system being constructed and arranged to focus upon said target an image of the arc stream, said target being of smaller dimensions than said arc stream image so that it receives only a portion of the arc stream image to the exclusion of an image of said incandescent electrode, and a reflector at the side of said lamp opposite from the optical system constructed and arranged to create an additional image of the incandescent electrode on the optical axis in the region between the electrodes and to cause the rays which form said electrode image to follow substantially the same optical path as the rays which form the arc stream image whereby radiation from said incandescent electrode supplements the radiation from said arc stream falling on said target.

3. In a light projection system, an electric discharge lamp comprising an envelope containing a pair of spaced electrodes, at least one of which is incandescent during operation of the lamp, a target, an optical system between said lamp and target having its axis normal to the line joining said electrodes and passing through said target, said optical system being constructed and arranged to focus upon said target an image of the arc stream, said target being of smaller dimensions than said arc stream image so that it receives only a portion of the arc stream image to the exclusion of an image of said incandescent electrode, and a spherical reflector at the side of said lamp opposite from the optical system having its center of curvature located substantially on the line joining said electrodes and midway between the optical axis and the incandescent electrode so as to create an additional image of the said incandescent electrode on the optical axis in the region between the electrodes and to cause the rays which form said electrode image to follow substantially the same optical path as the rays which form the arc stream image whereby radiation from said incandescent electrode supplements the radiation from said arc stream falling on said target.

4. In a sound recording system, an electric discharge lamp comprising an envelope containing a pair of spaced electrodes, at least one of which is incandescent during operation of the lamp, and a gaseous atmosphere capable of supporting an arc discharge between said electrodes which emits ultraviolet radiation but is relatively deficient in visible radiation, a target, an optical system constructed and arranged to focus upon said target an image of the arc stream, said target being of smaller dimensions than said arc stream image so that it receives only a portion of the arc stream image to the exclusion of an image of said incandescent electrode, and means for creating an additional image of said incandescent electrode on said target and for causing the rays which form said image to follow substantially the same optical path as the rays which form the arc stream image whereby visible radiation from said incandescent electrode supplements the ultraviolet radiation from said arc stream falling on said target.

5. In a sound recording system, an electric discharge lamp comprising an envelope containing a pair of spaced electrodes, at least one of which is incandescent during operation of the lamp, and a gaseous atmosphere capable of supporting an arc discharge between said electrodes which emits ultraviolet radiation but is relatively deficient in visible radiation, a target, an optical system between said lamp and target having its axis normal to the line joining said electrodes and passing through said target, said optical system being constructed and arranged to focus upon said target an image of the arc stream, said target being of smaller dimensions than said arc stream image so that it receives only a portion of the arc stream image to the exclusion of an image of said incandescent electrode, and a reflector at the side of said lamp opposite from the optical system constructed and arranged to create an additional image of the incandescent electrode on the optical axis in the region between the electrodes and to cause the rays which form said electrode image to follow substantially the same optical path as the rays which form the arc stream image whereby visible radiation from said incandescent electrode supplements the ultraviolet radiation from said arc stream falling on said target.

6. In a sound recording system an electric discharge lamp comprising an envelope containing a pair of spaced electrodes, at least one of which is incandescent during operation of the lamp, and a gaseous atmosphere capable of supporting an arc discharge between said electrodes which emits ultraviolet radiation but is relatively deficient in visible radiation, a target, an optical system between said lamp and target having its axis normal to the line joining said electrodes and passing through said target, said optical system being constructed and arranged to focus upon said target an image of the arc stream, said target being of smaller dimensions than said arc stream image so that it receives only a portion of the arc stream image to the exclusion of an image of said incandescent electrode, and a spherical reflector at the side of said lamp opposite from the optical system having its center of curvature located substantially on the line joining said electrodes and midway between the optical axis and the incandescent electrode so as to create an additional image of the said incandescent electrode on the optical axis in the region between the electrodes and to cause the rays which form said electrode image to follow substantially the same optical path as the rays which form the arc stream image whereby visible radiation from said incandescent electrode supplements the ultraviolet radiation from said arc stream falling on said target.

FRANK E. CARLSON.